(12) United States Patent
Kuroda et al.

(10) Patent No.: US 11,754,593 B2
(45) Date of Patent: Sep. 12, 2023

(54) SIGNAL PROCESSING DEVICE, INERTIAL SENSOR, SIGNAL PROCESSING METHOD, AND PROGRAM

(71) Applicant: Panasonic Intellectual Property Management Co., Ltd., Osaka (JP)

(72) Inventors: Keisuke Kuroda, Osaka (JP); Takuya Kajiwara, Osaka (JP); Junji Nakatsuka, Osaka (JP); Masaaki Nagai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 75 days.

(21) Appl. No.: 17/442,272

(22) PCT Filed: Jan. 30, 2020

(86) PCT No.: PCT/JP2020/003300
§ 371 (c)(1),
(2) Date: Sep. 23, 2021

(87) PCT Pub. No.: WO2020/195139
PCT Pub. Date: Oct. 1, 2020

(65) Prior Publication Data
US 2022/0155334 A1 May 19, 2022

(30) Foreign Application Priority Data
Mar. 26, 2019 (JP) .................................. 2019-059473

(51) Int. Cl.
*G01P 15/125* (2006.01)
*G01P 15/18* (2013.01)
(Continued)

(52) U.S. Cl.
CPC ........ *G01P 15/125* (2013.01); *G01P 15/0802* (2013.01); *G01P 15/18* (2013.01); *G01P 21/00* (2013.01)

(58) Field of Classification Search
CPC ........ G01P 15/18; G01P 15/08; G01P 15/125; G01P 21/00; G01P 15/0802
See application file for complete search history.

(56) References Cited

U.S. PATENT DOCUMENTS 4,601,206 A * 7/1986 Watson .................. G01C 21/16
73/510
6,636,826 B1 * 10/2003 Abe ..................... G02B 27/017
702/151
(Continued)

FOREIGN PATENT DOCUMENTS

JP 2002-022760 A 1/2002
JP 2011-164073 A 8/2011
(Continued)

OTHER PUBLICATIONS

International Search Report and Written Opinion issued in International Patent Application No. PCT/JP2020/003300, dated Mar. 31, 2020; with partial English translation.

*Primary Examiner* — Helen C Kwok
(74) *Attorney, Agent, or Firm* — McDermott Will & Emery LLP (57) ABSTRACT

A signal processing device includes a detection circuit, a correction circuit, and a comparator circuit. The detection circuit generates a first detection signal, based on an output signal of a capacitive detection element that detects inertial force. The correction circuit corrects non-linearity of the first detection signal and outputs a second detection signal thus corrected. The comparator circuit compares the first detec- (Continued)

tion signal and the second detection signal with each other and outputs a comparison signal representing a result of comparison.

12 Claims, 5 Drawing Sheets

(51) Int. Cl.
*G01P 21/00* (2006.01)
*G01P 15/08* (2006.01)

(56) References Cited

U.S. PATENT DOCUMENTS

| | | |
|---|---|---|
| 2004/0139800 A1 | 7/2004 | Campbell |
| 2010/0057384 A1* | 3/2010 | Inukai ................ G01C 19/5607 702/56 |
| 2012/0136632 A1* | 5/2012 | Balslink ................. G01C 19/56 702/189 |
| 2015/0077579 A1* | 3/2015 | Uemura ............. G01C 19/5614 348/208.4 |
| 2016/0157017 A1* | 6/2016 | Lesso .................... G01P 15/125 381/71.7 |
| 2018/0267079 A1* | 9/2018 | Shinohara ............... H01L 29/84 |
| 2020/0041877 A1* | 2/2020 | Murakoshi .............. G01P 15/18 |
| 2022/0155337 A1* | 5/2022 | Kuroda ................... G01P 15/18 |

FOREIGN PATENT DOCUMENTS

| | | |
|---|---|---|
| JP | 2015-017819 A | 1/2015 |
| JP | 2018-115891 A | 7/2018 |

* cited by examiner

SIGNAL PROCESSING DEVICE, INERTIAL SENSOR, SIGNAL PROCESSING METHOD, AND PROGRAM

CROSS-REFERENCE OF RELATED APPLICATIONS

This application is the U.S. National Phase under 35 U.S.C. § 371 of International Patent Application No. PCT/JP2020/003300, filed on Jan. 30, 2020, which in turn claims the benefit of Japanese Application No. 2019-059473, filed on Mar. 26, 2019, the entire disclosures of which Applications are incorporated by reference herein.

TECHNICAL FIELD

The present disclosure generally relates to a signal processing device, an inertial sensor, a signal processing method, and a program. More particularly, the present disclosure relates to a signal processing device for processing a signal supplied from a detection element to detect inertial force, an inertial sensor, a signal processing method, and a program.

BACKGROUND ART

Patent Literature 1 describes a capacitive acceleration sensor (inertial sensor). The acceleration sensor of Patent Literature 1 includes a sensor chip (detection element) and an ASIC (signal processing device). The ASIC includes an automatic correction circuit (correction circuit) to correct deviation from an ideal output by subtracting a correction value from input acceleration. The correction value is to be calculated by a polynomial that uses the input acceleration as a variable.

The acceleration sensor of Patent Literature 1 is unable to determine whether the automatic correction circuit is operating properly or not.

CITATION LIST

Patent Literature

Patent Literature 1: JP 2015-17819 A

SUMMARY OF INVENTION

An object of the present disclosure is to provide a signal processing device, an inertial sensor, a signal processing method, and a program, all of which are configured or designed to be able to perform an operation check on a correction circuit (i.e., determine whether the correction circuit is operating properly or not).

A signal processing device according to an aspect of the present disclosure includes a detection circuit, a correction circuit, and a comparator circuit. The detection circuit generates a first detection signal, based on an output signal of a capacitive detection element that detects inertial force. The correction circuit corrects non-linearity of the first detection signal and outputs a second detection signal thus corrected. The comparator circuit compares the first detection signal and the second detection signal with each other and outputs a comparison signal representing a result of comparison.

An inertial sensor according to another aspect of the present disclosure includes the signal processing device described above and the capacitive detection element described above.

A signal processing method according to still another aspect of the present disclosure includes a detection step, a correction step, and a comparison step. The detection step includes generating a first detection signal, based on an output signal of a capacitive detection element that detects inertial force. The correction step includes correcting non-linearity of the first detection signal and outputting a second detection signal thus corrected. The comparison step includes comparing the first detection signal and the second detection signal with each other and outputting a comparison signal representing a result of comparison.

A program according to yet another aspect of the present disclosure is designed to cause one or more processors to perform the signal processing method described above.

DESCRIPTION OF EMBODIMENTS

Embodiment

Figure 2:
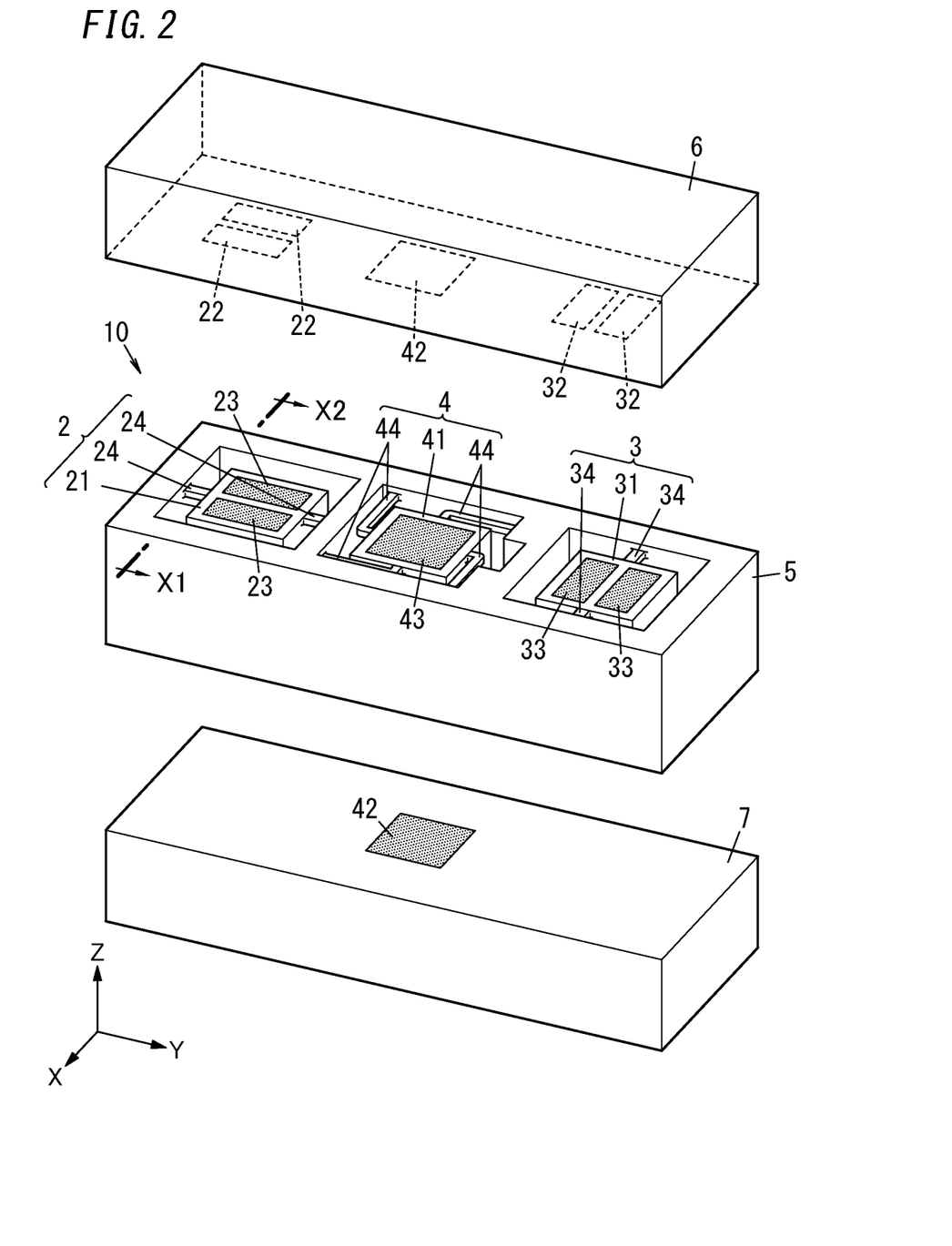
FIG. 2 is an exploded perspective view of a detection element as a constituent element of the inertial sensor.
Figure 3:
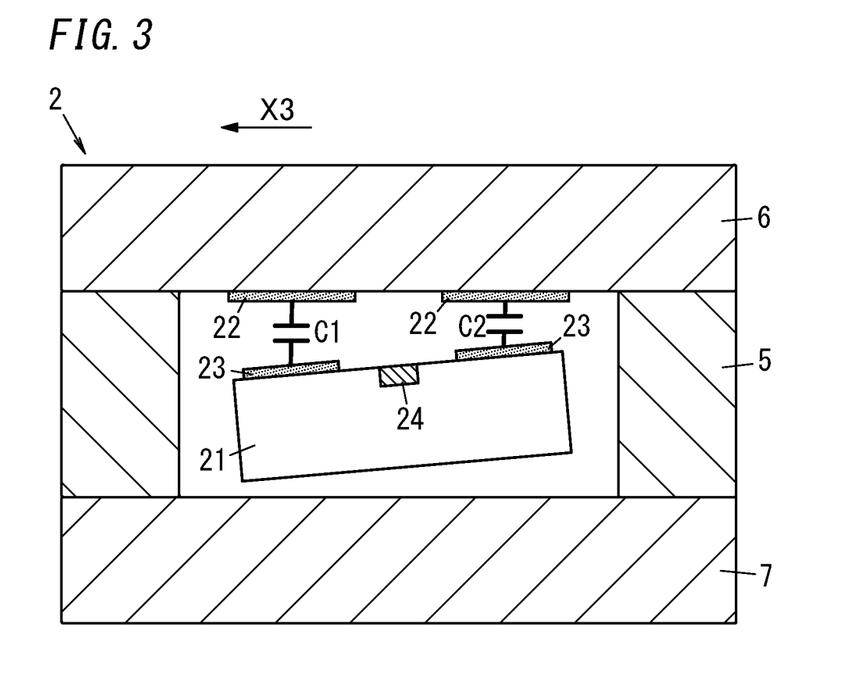
FIG. 3 is a cross-sectional view taken along the plane X1-X2 shown in FIG. 2.

FIGS. 2 and 3 to be referred to in the following description of embodiments and its variations are all schematic representations. Thus, the ratio of the dimensions (including thicknesses) of respective constituent elements illustrated on the drawings does not always reflect their actual dimensional ratio.

(1) Overview

An overview of an inertial sensor 10 according to this embodiment will be described with reference to FIG. 1.

The inertial sensor 10 according to this embodiment is a sensor for detecting inertial force, and may be, for example, a triaxial acceleration sensor which detects acceleration in three axial directions perpendicular to each other. Specifically, the inertial sensor 10 according to this embodiment may detect acceleration in the X-axis direction, acceleration in the Y-axis direction, and acceleration in the Z-axis direction. The inertial sensor 10 may be, for example, a surface-mounted acceleration sensor which is mounted on the surface of a printed wiring board. The inertial sensor 10 may be implemented, for example, as a capacitive acceleration sensor (see FIG. 3).

Figure 1:
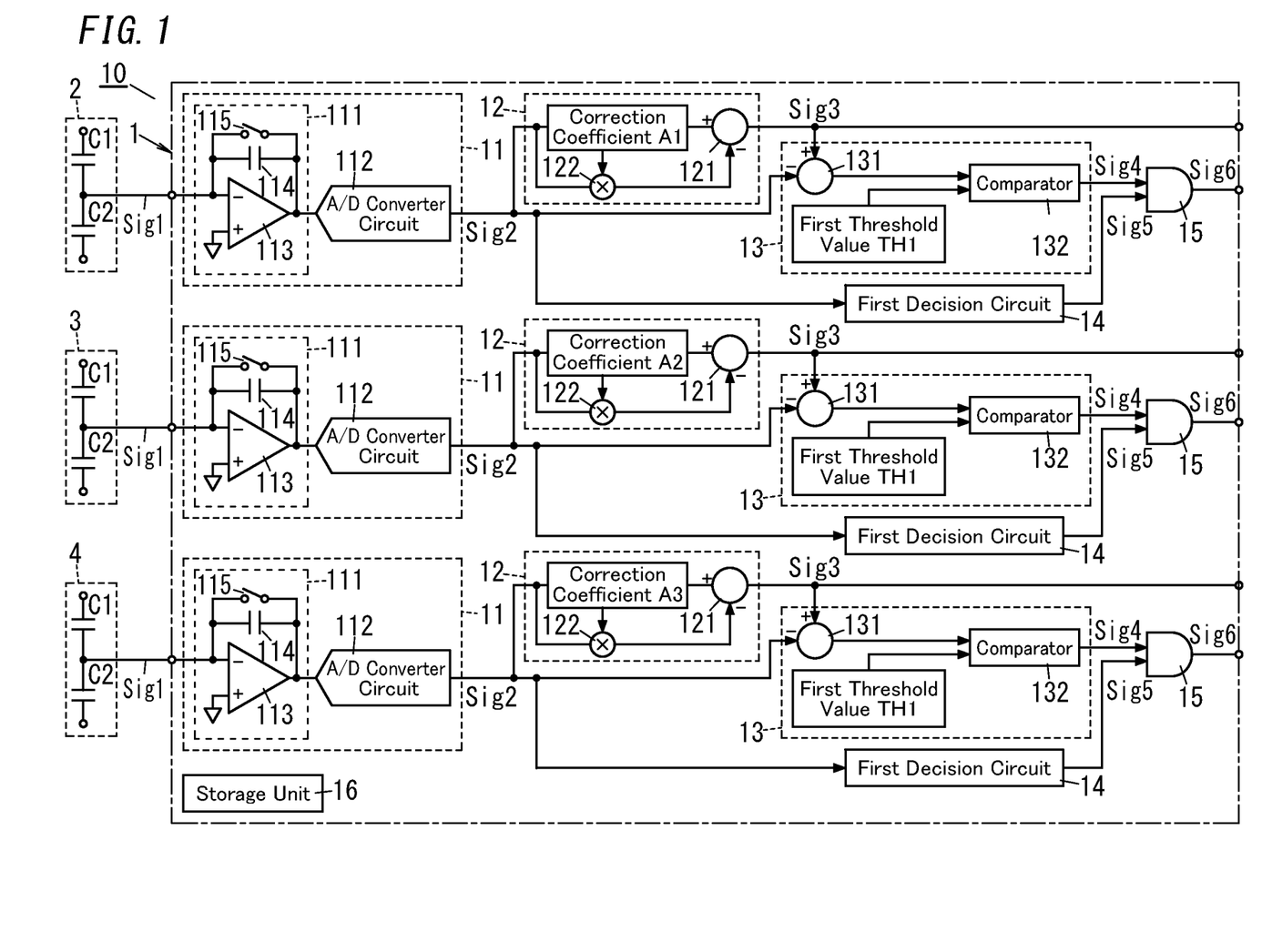
FIG. 1 is a schematic diagram showing a configuration for a signal processing device and inertial sensor according to an exemplary embodiment of the present disclosure.

As shown in FIG. 1, the inertial sensor 10 according to this embodiment includes a signal processing device 1 and a plurality of (three in the example illustrated in FIG. 1) detection elements 2, 3, 4. The signal processing device 1 may be, for example, an ASIC (Application Specific Integrated Circuit). The detection element 2 detects inertial force (acceleration) in the X-axis direction. The detection element 3 detects inertial force (acceleration) in the Y-axis direction. The detection element 4 detects inertial force (acceleration) in the Z-axis direction.

In general, an inertial sensor 10 of this type is designed to exhibit such a response characteristic that ideally allows the magnitude of inertial force and the magnitude of sensor output to change linearly. Actually, however, when the magnitude of inertial force becomes equal to or greater than a certain value, the magnitude of the sensor output starts changing to deviate from its ideal linear characteristic. To overcome this problem, an acceleration sensor including a correction circuit to correct the deviation of sensor output has been provided in the pertinent art. Nonetheless, no acceleration sensors have been provided so far which are configured to be able to determine whether the correction circuit is operating properly or not. The signal processing device 1 according to this embodiment adopts the following configuration so as to determine whether the correction circuit is operating properly or not.

As shown in FIG. 1, the signal processing device 1 according to this embodiment includes a detection circuit 11, a correction circuit 12, and a comparator circuit 13. The detection circuit 11 generates a first detection signal Sig2, based on an output signal Sig1 of a capacitive detection element 2, 3, 4 that detects inertial force. The correction circuit 12 corrects non-linearity of the first detection signal Sig2 and outputs a second detection signal Sig3 thus corrected. The comparator circuit 13 compares the first detection signal Sig2 and the second detection signal Sig3 with each other, and outputs a comparison signal Sig4 representing a result of the comparison. As used herein, the term "non-linearity" refers to the degree of deviation from linearity as to the response characteristic that ideally allows the input and output of a sensor to change linearly. In this context, the degree of non-linearity increases as the degree of deviation from linearity increases, and the degree of non-linearity decreases as the degree of deviation from linearity decreases. In other words, the linearity deteriorates as the degree of non-linearity increases, and the linearity improves as the degree of non-linearity decreases.

The signal processing device 1 according to this embodiment compares the first detection signal Sig2 supplied from the detection circuit 11 and the second detection signal Sig3 supplied from the correction circuit 12 with each other. Then, the signal processing device 1 outputs the comparison signal Sig4 representing a result of the comparison. In this embodiment, the correction circuit 12 corrects the non-linearity of the first detection signal Sig2 supplied from the detection circuit 11. Thus, when inertial force of a predetermined magnitude or more is generated, a difference with a predetermined value or more is caused between the respective values of the first detection signal Sig2 and the second detection signal Sig3. Therefore, the signal processing device 1 may decide, when finding, based on the result of comparison between the first detection signal Sig2 and the second detection signal Sig3, that no difference with a predetermined value or more has been caused, that the correction circuit 12 be operating improperly. That is to say, the signal processing device 1 according to this embodiment may determine, based on the comparison signal Sig4 supplied from the comparator circuit 13, whether the correction circuit 12 is operating properly or not.

(2) Configuration

Next, a configuration of the inertial sensor 10 according to this embodiment will be described with reference to FIGS. 1, 2, and 3.

As shown in FIG. 1, the inertial sensor 10 according to this embodiment includes the signal processing device 1 and a plurality of (e.g., three in the example illustrated in FIG. 1) detection elements 2, 3, 4.

(2.1) Signal Processing Device

The signal processing device 1 includes a plurality of (e.g., three in the example illustrated in FIG. 1) detection circuits 11, a plurality of (e.g., three in the example illustrated in FIG. 1) correction circuits 12, a plurality of (e.g., three in the example illustrated in FIG. 1) comparator circuits 13, a plurality of (e.g., three in the example illustrated in FIG. 1) first decision circuits 14, and a plurality of (e.g., three in the example illustrated in FIG. 1) second decision circuits 15. The signal processing device 1 further includes a storage unit 16.

The plurality of detection circuits 11, the plurality of correction circuits 12, the plurality of comparator circuits 13, the plurality of first decision circuits 14, and the plurality of second decision circuits 15 have one-to-one correspondence to (or association with) the plurality of detection elements 2, 3, 4. That is to say, one detection circuit 11, one correction circuit 12, one comparator circuit 13, one first decision circuit 14, and one second decision circuit 15 are associated with each of the detection elements 2, 3, 4.

Each of the plurality of detection circuits 11 generates a first detection signal Sig2, based on the output signal Sig1 of an associated one of the detection elements 2, 3, 4. Each of the plurality of correction circuits 12 corrects the non-linearity of the first detection signal Sig2 supplied from an associated one of the plurality of detection circuits 11, and outputs a second detection signal Sig3 thus corrected. Each of the plurality of comparator circuits 13 compares the first detection signal Sig2 provided by an associated one of the plurality of detection circuits 11 and the second detection signal Sig3 provided by an associated one of the plurality of correction circuits 12 with each other. Then, each of the plurality of comparator circuits 13 outputs a comparison signal Sig4 representing the result of the comparison.

Each of the plurality of first decision circuits 14 determines the magnitude of inertial force, based on the first detection signal Sig2 supplied from an associated one of the plurality of detection circuits 11. Then, each of the plurality of first decision circuits 14 outputs a first decision signal Sig5 representing the result of decision. Each of the plurality of second decision circuits 15 determines, based on the comparison signal Sig4 provided by an associated one of the plurality of comparator circuits 13 and the first decision signal Sig5 provided by an associated one of the plurality of first decision circuits 14, whether the associated correction circuit 12 is operating properly or not. Then, each of the plurality of second decision circuits 15 outputs a second decision signal Sig6 representing the result of decision.

(2.1.1) Detection Circuit

As shown in FIG. 1, each of the plurality of detection circuits 11 includes a CV converter circuit 111 and an A/D converter circuit 112.

The CV converter circuit 111 converts a change in capacitance caused by each of the detection elements 2, 3, 4 into a voltage. The CV converter circuit 111 includes an amplifier 113, a capacitor 114, and a switch 115. An inverting input terminal of the amplifier 113 is electrically connected to a node of connection between two capacitors C1, C2 which form part of each of the detection elements 2, 3, 4. The capacitor 114 and the switch 115 are electrically connected in parallel between the inverting input terminal and an output terminal of the amplifier 113. Moreover, a reference voltage is input to a non-inverting input terminal of the amplifier 113.

The A/D converter circuit 112 generates a digital first detection signal Sig2, based on an analog output signal Sig1 supplied from each of the detection elements 2, 3, 4 via the CV converter circuit 111. The digital first detection signal Sig2 converted by the A/D converter circuit 112 is supplied to the correction circuit 12, the comparator circuit 13, and the first decision circuit 14.

(2.1.2) Correction Circuit

As shown in FIG. 1, each of the plurality of correction circuits 12 includes a subtractor 121 and a multiplier 122.

The multiplier 122 multiples the first detection signal Sig2 supplied from the detection circuit 11 by any of correction coefficients A1, A2, or A3 and outputs the calculation result to the subtractor 121. The subtractor 121 subtracts the first detection signal Sig2, which has been multiplied by any of the correction coefficients A1, A2, or A3, from the first detection signal Sig2 provided by the detection circuit 11. This allows generating a second detection signal Sig3 by correcting the non-linearity of the first detection signal Sig2. Specifically, each of the correction coefficients A1, A2, and A3 used by the multiplier 122 is a coefficient associated with the difference between a theoretical value and an actually measured value of the first detection signal Sig2. The second detection signal Sig3 generated by the subtractor 121 is supplied to not only the comparator circuit 13 but also to a control circuit which is mounted on the printed wiring board. The control circuit detects the magnitude of the inertial force (acceleration), based on the second detection signal Sig3 supplied from the correction circuit 12.

(2.1.3) Comparator Circuit

As shown in FIG. 1, each of the plurality of comparator circuit 13 includes a subtractor 131 and a comparator 132.

The subtractor 131 subtracts the first detection signal Sig2 provided by the detection circuit 11 from the second detection signal Sig3 provided by the correction circuit 12. That is to say, the subtractor 131 calculates the difference between the respective values of the first detection signal Sig2 and the second detection signal Sig3.

The comparator 132 may be implemented as a comparator, for example. The comparator 132 receives, at one input terminal thereof, a signal (differential signal) from the subtractor 131 and also receives a first threshold value TH1 at the other input terminal thereof. The first threshold value TH1 is stored in the storage unit 16. The comparator 132 compares the value of the differential signal supplied from the subtractor 131 and the first threshold value TH1 with each other and outputs a comparison signal Sig4 representing the result of the comparison. The comparator 132 outputs a comparison signal Sig4 in logic "1" state if the value of the differential signal is equal to or less than the first threshold value TH1. Meanwhile, the comparator 132 outputs the comparison signal Sig4 in logic "0" state if the value of the differential signal is greater than the first threshold value TH1. The comparison signal Sig4 is input to the second decision circuit 15.

(2.1.4) First Decision Circuit

Each of the plurality of first decision circuits 14 is configured to output the first decision signal Sig5 representing the magnitude of inertial force (acceleration). Each of the plurality of first decision circuits 14 determines the magnitude of the inertial force (acceleration), based on the first detection signal Sig2 provided by an associated one of the plurality of detection circuits 11. The first decision circuit 14 determines the magnitude of the inertial force (acceleration) by comparing the value of the first detection signal Sig2 and a second threshold value which is stored in the storage unit 16 and outputs the first decision signal Sig5 representing the result of the decision. The first decision circuit 14 outputs a first decision signal Sig5 in logic "1" state if the value of the first detection signal Sig2 is equal to or greater than the second threshold value. Meanwhile, the first decision circuit 14 outputs a first decision signal Sig5 in logic "0" state if the value of the first detection signal Sig2 is less than the second threshold value. The first decision signal Sig5 is input to the second decision circuit 15.

(2.1.5) Second Decision Circuit

As shown in FIG. 1, each of the plurality of second decision circuits 15 is implemented as, for example, an AND circuit. Each of the plurality of second decision circuits 15 receives the comparison signal Sig4 from an associated one of the plurality of comparator circuits 13 and the first decision signal Sig5 from an associated one of the plurality of first decision circuits 14. Then, the second decision circuit 15 outputs a second decision signal Sig6 based on the comparison signal Sig4 and the first decision signal Sig5. For example, if the value of the first decision signal Sig5 is "1" and the value of the comparison signal Sig4 is "1," then the value of the second decision signal Sig6 is "1." On the other hand, if the value of the first decision signal Sig5 is "0" and/or the value of the comparison signal Sig4 is "0," the value of the second decision signal Sig6 is "0." The second decision signal Sig6 is input to the control circuit described above. The control circuit decides that the correction circuit 12 be operating improperly if the value of the second decision signal Sig6 is "1." Meanwhile, the control circuit decides that the correction circuit 12 be operating properly if the value of the second decision signal Sig6 is "0".

In other words, the second decision circuit 15 decides that the correction circuit 12 be operating improperly, if the result of comparison obtained by the comparator circuit 13 satisfies a first condition and the result of decision obtained by the first decision circuit 14 satisfies a second condition. Meanwhile, the second decision circuit 15 decides that the correction circuit 12 be operating properly if the result of the comparison obtained by the comparator circuit 13 does not satisfy the first condition and the result of decision obtained by the first decision circuit 14 satisfies the second condition.

In this embodiment, the first condition is satisfied if the absolute value of the difference between the respective values of the first detection signal Sig2 and the second detection signal Sig3 is equal to or less than the first threshold value TH1. In other words, the result of the comparison obtained by the comparator circuit 13 satisfies the first condition if the absolute value of the difference between the respective values of the first detection signal Sig2 and the second detection signal Sig3 is equal to or less than the first threshold value TH1. On the other hand, the second condition is satisfied if the magnitude of inertial force determined based on the first detection signal Sig2 is equal to or greater than the second threshold value. In other words, the result of the decision obtained by the first decision circuit 14 satisfies the second condition if the magnitude of inertial force determined based on the first detection signal Sig2 is equal to or greater than the second threshold value.

(2.1.6) Storage Unit

The storage unit 16 may be, for example, a register of the ASIC. The storage unit 16 stores the correction coefficients A1, A2, A3, the first threshold value TH1, and the second threshold value. In this embodiment, the second threshold value is a decision threshold value to be used by the first decision circuit 14 to determine the magnitude of the inertial force based on the first detection signal Sig2. The storage unit 16 is configured to be able to rewrite at least the second threshold value. Therefore, the storage unit 16 may be configured to be able to rewrite at least one of correction coefficients A1, A2, A3, or the first threshold value TH1.

(2.2) Detection Element

The detection element 2 detects inertial force (acceleration) in the X-axis direction. The detection element 3 detects inertial force (acceleration) in the Y-axis direction. The detection element 4 detects inertial force (acceleration) in the Z-axis direction. That is to say, the inertial sensor 10 according to this embodiment is a triaxial acceleration sensor which may detect acceleration in the X-axis direction, acceleration in the Y-axis direction, and acceleration in the Z-axis direction.

As shown in FIG. 2, the inertial sensor 10 according to this embodiment further includes a housing 5, an upper cover 6, and a lower cover 7. Each of the housing 5, the upper cover 6, and the lower cover 7 is formed in a rectangular parallelepiped shape elongated in the Y-axis direction, and their external dimensions (dimensions in the X-axis direction and dimensions in the Y-axis direction) are generally the same when viewed in the Z-axis direction.

The detection element 2 includes a weight 21, a pair of fixed electrodes 22, 22, and a pair of moving electrodes 23, 23. The weight 21 is formed in a rectangular shape when viewed in the Z-axis direction. The weight 21 is fixed to the housing 5 via a pair of beams 24, 24 at both ends in the Y-axis direction. The pair of moving electrodes 23, 23 are mounted on the upper surface of the weight 21 (the surface facing the upper cover 6) in a state where the pair of moving electrodes 23, 23 are arranged side by side in the X-axis direction. The pair of fixed electrodes 22, 22 are mounted on the lower surface of the upper cover 6 (the surface facing the housing 5) in a state where the pair of fixed electrodes 22, 22 are arranged side by side in the X-axis direction. The pair of fixed electrodes 22, 22 and the pair of moving electrodes 23, 23 face each other with a predetermined gap left between themselves in a state where the housing 5 and the upper cover 6 are laid one on top of the other. The detection element 2 is configured to, when acceleration is applied in the X-axis direction, swing in a ZX plane around the pair of beams 24, 24 as a fulcrum.

The detection element 3 includes a weight 31, a pair of fixed electrodes 32, 32, and a pair of moving electrodes 33, 33. The weight 31 is formed in a rectangular shape when viewed in the Z-axis direction. The weight 31 is fixed to the housing 5 via a pair of beams 34, 34 at both ends in the X-axis direction. The pair of moving electrodes 33, 33 are mounted on the upper surface of the weight 31 (the surface facing the upper cover 6) in a state where the pair of moving electrodes 33, 33 are arranged side by side in the Y-axis direction. The pair of fixed electrodes 32, 32 are mounted on the lower surface of the upper cover 6 (the surface facing the housing 5) in a state where the pair of fixed electrodes 32, 32 are arranged side by side in the Y-axis direction. The pair of fixed electrodes 32, 32 and the pair of moving electrodes 33, 33 face each other with a predetermined gap left between themselves in a state where the housing 5 and the upper cover 6 are laid one on top of the other. The detection element 3 is configured to, when acceleration is applied in the Y-axis direction, swing in a YZ plane around the pair of beams 34, 34 as a fulcrum.

The detection element 4 includes a weight 41, a pair of fixed electrodes 42, 42, and a pair of moving electrodes 43, 43 (of which only the upper moving electrode 43 is shown in FIG. 2). The weight 41 is formed in a rectangular shape when viewed in the Z-axis direction. The weight 41 is fixed to the housing 5 via four beams 44, each of which is formed in an L shape. The pair of moving electrodes 43, 43 are mounted on both surfaces in the Z-axis direction of the weight 41. One fixed electrode 42 out of the pair of fixed electrodes 42, 42 is mounted on the lower surface of the upper cover 6. Meanwhile, the other fixed electrode 42 out of the pair of fixed electrodes 42, 42 is mounted on the upper surface of the lower cover 7. The one fixed electrode 42 out of the pair of fixed electrodes 42, 42 and one moving electrode 43 out of the pair of moving electrodes 43, 43 face each other with a predetermined gap left between themselves in a state where the housing 5, the upper cover 6, and the lower cover 7 are laid one on top of the other. Meanwhile, the other fixed electrode 42 out of the pair of fixed electrodes 42, 42 and the other moving electrode 43 out of the pair of moving electrodes 43, 43 face each other with a predetermined gap left between themselves in a state where the housing 5, the upper cover 6, and the lower cover 7 are laid one on top of the other. The detection element 4 is configured to, when acceleration is applied in the Z-axis direction, be movable in the Z-axis direction around the four beams 44 as a fulcrum.

FIG. 3 is a cross-sectional view taken along the plane X1-X2 shown in FIG. 2 and illustrates the detection element 2. One fixed electrode 22 (illustrated on the left side in FIG. 3) out of the pair of fixed electrodes 22, 22 and one moving electrode 23 (illustrated on the left side in FIG. 3) out of the pair of moving electrodes 23, 23 form the capacitor C1. Moreover, the other fixed electrode 22 (illustrated on the right side in FIG. 3) out of the pair of fixed electrodes 22, 22 and the other moving electrode 23 (illustrated on the right side in FIG. 3) out of the pair of moving electrodes 23, 23 form the capacitor C2. Suppose a situation where acceleration is acting to this structure in the direction indicated by the arrow X3 (hereinafter referred to as "X3 direction") in FIG. 3. In that case, the weight 21 of the detection element 2 is caused, by the acceleration thus applied, to swing in the ZX plane around the pair of beams 24, 24 as a fulcrum. In the example shown in FIG. 3, upon the application of the acceleration in the X3 direction, the gap between one fixed electrode 22 and one moving electrode 23 has broadened, while the gap between the other fixed electrode 22 and the other moving electrode 23 has narrowed. This causes a decrease in the capacitance of the capacitor C1 and an increase in the capacitance of the capacitor C2, compared to a situation where no acceleration is applied in the X3 direction. Therefore, the inertial sensor 10 according to this embodiment may detect the acceleration applied in the X3 direction, based on the capacitance values of these two capacitors C1 and C2.

In this embodiment, suppose the surface area of each of the pair of fixed electrodes 22, 22 and the pair of moving electrodes 23, 23 when viewed in the Z-axis direction is Sa, the relative dielectric constant thereof is ε0, and the inter-electrode distances of the capacitors C1, C2 are d1, d2, respectively. In that case, the capacitance values Ca, Cb of the capacitors C1 and C2 are given by the following Equations (1) and (2), respectively:

[Equation 1]

$$Ca = \varepsilon 0 \times (Sa/d1) \tag{1}$$

[Equation 2]

$$Cb = \varepsilon 0 \times (Sa/d2) \tag{2}$$

The inter-electrode distance d2 decreases if the inter-electrode distance d1 increases as the acceleration increases. Conversely, the inter-electrode distance d2 increases if the inter-electrode distance d1 decreases as the acceleration increases. Therefore, the acceleration is proportional to the difference (Ca−Cb) between the capacitance values Ca, Cb of the capacitors C1 and C2.

Figure 4:
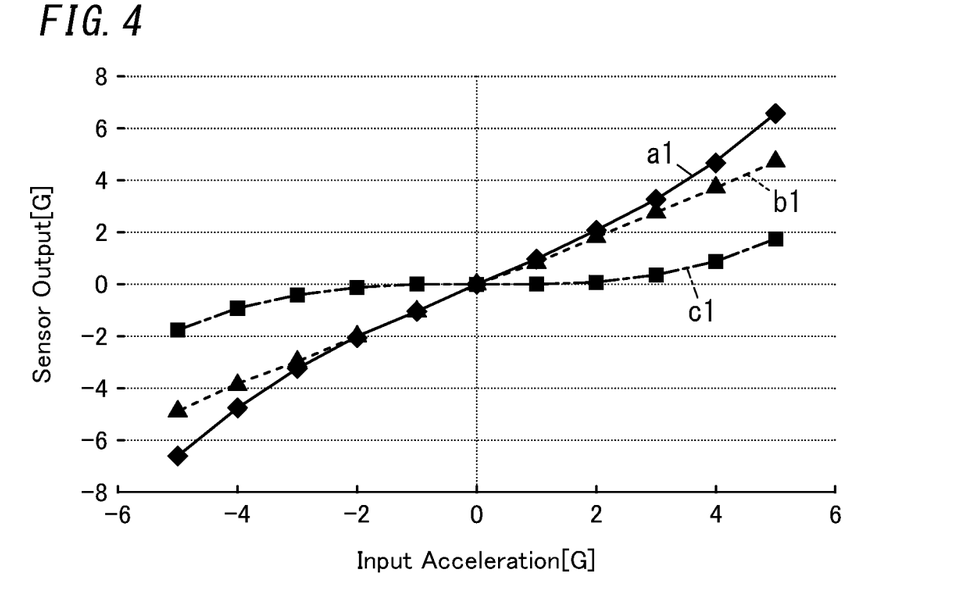
FIG. 4 is a graph showing relationships between input acceleration and sensor output of the inertial sensor.

FIG. 4 is a graph showing relationships between the input acceleration and sensor output of the inertial sensor 10 according to this embodiment. In FIG. 4, the abscissa indicates the input acceleration, and the ordinate indicates the sensor output. Specifically, in FIG. 4, the solid curve a1 represents a relationship between the input acceleration yet to be subjected to the correction and the sensor output, the dashed curve b1 represents a relationship between the input acceleration subjected to the correction and the sensor output, and the one-dot chain curve c1 represents the difference between the two curves respectively representing the characteristics before and after the correction. The acceleration is proportional to the difference (Ca−Cb) between the capacitance values Ca, Cb of the capacitors C1 and C2 forming part of the detection element 2. The difference (Ca−Cb) between the capacitance values Ca, Cb is proportional to (1/d1−1/d2). Furthermore, as the acceleration increases, the inter-electrode distance d1, d2 changes increasingly non-linearly with the increase in acceleration. Therefore, non-linearity is significant in a range where the input acceleration is high (see FIG. 4).

As an example, suppose that an error caused by the non-linearity of the inertial sensor 10 is at least 1% in a situation where an acceleration of 10 G is applied. In that case, the value of the first detection signal Sig2 which is the signal yet to be subjected to the correction, is equal to or more than 10.1 G If the value of the first detection signal Sig2 is equal to or more than 10.1 G, the value of the second detection signal Sig3 is 10 G This makes a difference of 0.1 G between the respective values of the first detection signal Sig2 and the second detection signal Sig3. In that case, by setting the first threshold value TH1 at 0.05 G, for example, a decision is made that the correction circuit 12 be operating properly if the difference is greater than the first threshold value TH1. Meanwhile, a decision is made that the correction circuit 12 be operating improperly if the first threshold value TH1 is less than the difference.

In this case, as shown in FIG. 4, when the input acceleration is low, the non-linearity error is also insignificant. Therefore, a determination whether the correction circuit 12 is operating properly or not is preferably made only in a range where the non-linearity error is significant to some extent (e.g., 4 G or more in FIG. 4).

Furthermore, in the example shown in FIG. 4, the decision threshold value (second threshold value) to be used by the first decision circuit 14 to determine the magnitude of the inertial force is preferably set at about 4 G at which the non-linearity of the acceleration starts to be significant.

(3) Operation

Figure 5:
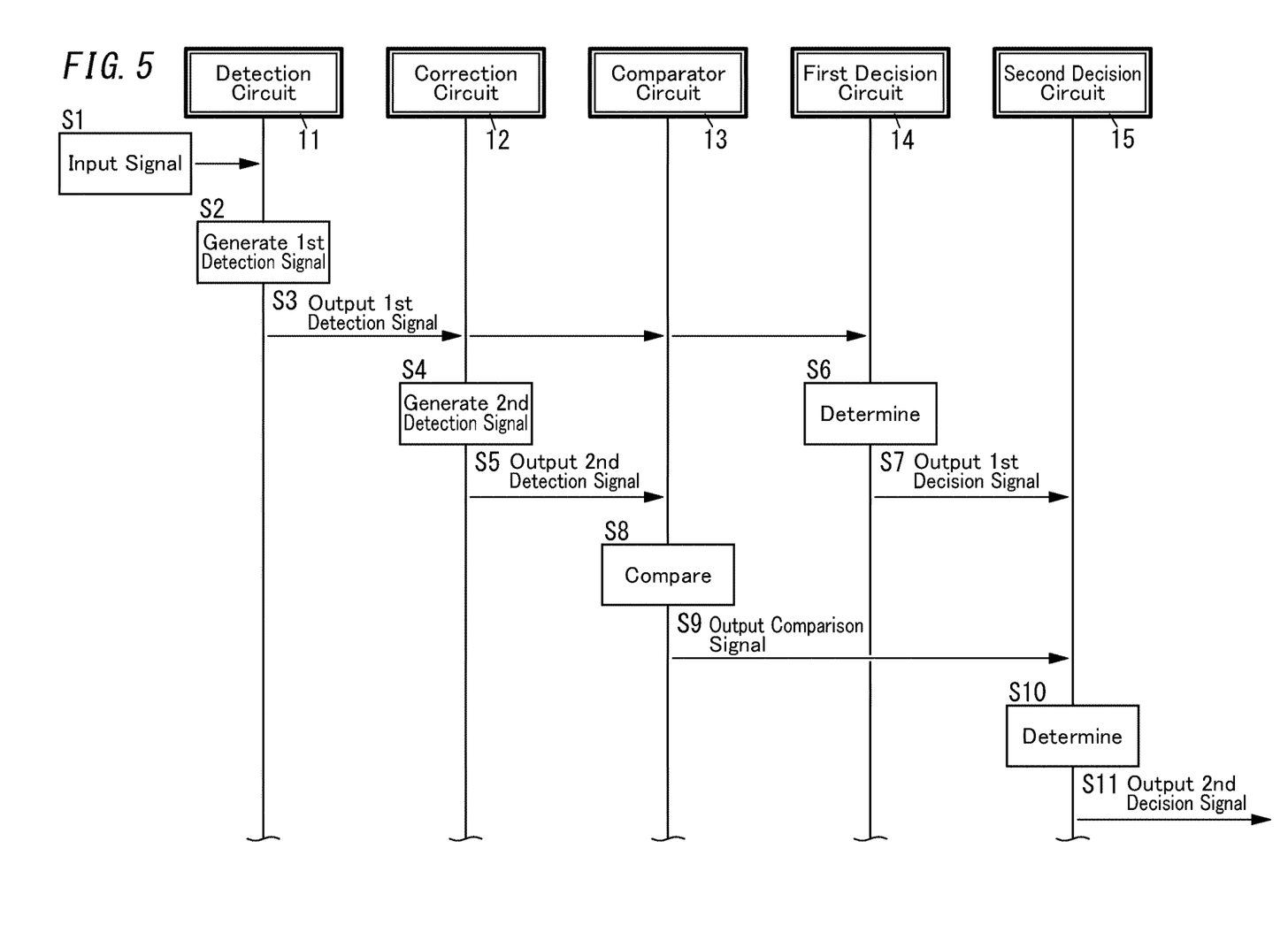
FIG. 5 is a sequence chart showing how the signal processing device operates.

Next, the operation of the signal processing device 1 according to this embodiment will be described with reference to a sequence chart shown in FIG. 5. The following description will be focused on, as an example, a situation where the acceleration is acting in the X-axis direction. However, almost the same statement applies to the other two situations where the acceleration is acting in the Y- and Z-axis directions, respectively, and therefore, description thereof will be omitted herein.

When detecting the acceleration in the X-axis direction, the detection element 2 provides an output signal Sig1 to an associated one of the detection circuits 11 (in a first step S1). The detection circuit 11 generates a first detection signal Sig2, based on the output signal Sig1 supplied from the detection element 2 (in a second step S2). The detection circuit 11 outputs the first detection signal Sig2 thus generated to its associated correction circuit 12, comparator circuit 13, and first decision circuit 14 (in a third step S3).

The correction circuit 12 corrects the non-linearity of the first detection signal Sig2 supplied from the detection circuit 11 and generates a second detection signal Sig3 thus corrected (in a fourth step S4). Specifically, the correction circuit 12 subtracts the product of the first detection signal Sig2 and the correction coefficient A1 from the value of the first detection signal Sig2. The correction circuit 12 outputs the second detection signal Sig3 thus generated to the control circuit described above and the comparator circuit 13 (in a fifth step S5).

The first decision circuit 14 determines the magnitude of the inertial force (acceleration) based on the first detection signal Sig2 provided by the detection circuit 11 (in a sixth step S6). Specifically, the first decision circuit 14 compares the value of the first detection signal Sig2 and the first threshold value TH1 with each other and generates a first decision signal Sig5 representing a result of the comparison. Then, the first decision circuit 14 outputs the first decision signal Sig5 thus generated to the second decision circuit 15 (in a seventh step S7).

The comparator circuit 13 compares the first detection signal Sig2 supplied from the detection circuit 11 and the second detection signal Sig3 supplied from the correction circuit 12 with each other (in an eighth step S8). Specifically, the comparator circuit 13 calculates the difference between the respective values of the second detection signal Sig3 and the first detection signal Sig2 and compares the difference with the first threshold value TH1. Then, the comparator circuit 13 generates a comparison signal Sig4 representing a result of the comparison and outputs the comparison signal Sig4 thus generated to the second decision circuit 15 (in a ninth step S9).

The second decision circuit 15 determines, based on the comparison signal Sig4 supplied from the comparator circuit 13 and the first decision signal Sig5 supplied from the first decision circuit 14, whether the correction circuit 12 is operating properly or not (in a tenth step S10). Specifically, the second decision circuit 15 generates a second decision signal Sig6 having a value of "1," if the value of the comparison signal Sig4 is "1" and the value of the first decision signal Sig5 is "1." On the other hand, the second decision circuit 15 generates a second decision signal Sig6 having a value of "0," if the value of the comparison signal Sig4 is "0" and/or the value of the first decision signal Sig5 is "0." The second decision circuit 15 outputs the second decision signal Sig6 thus generated to the control circuit described above (in an eleventh step S11).

(4) Advantages

The signal processing device 1 according to this embodiment compares the first detection signal Sig2 supplied from the detection circuit 11 and the second detection signal Sig3 supplied from the correction circuit 12 with each other. Then, the signal processing device 1 outputs the comparison signal Sig4 representing the result of the comparison. In this embodiment, the correction circuit 12 corrects the non-linearity of the first detection signal Sig2 supplied from the detection circuit 11. This makes a difference with a predetermined value or more between the respective values of the first detection signal Sig2 and the second detection signal Sig3. Therefore, the signal processing device 1 may decide, when finding, based on the result of comparison between the first detection signal Sig2 and the second detection signal Sig3, that no difference with a predetermined value or more has been caused, that the correction circuit 12 be operating improperly. That is to say, the signal processing device 1 according to this embodiment may determine, based on the comparison signal Sig4 supplied from the comparator circuit 13, whether the correction circuit 12 is operating properly or not.

Moreover, in the signal processing device 1 according to this embodiment, the second decision circuit 15 decides that the correction circuit 12 be operating improperly, if the result of comparison obtained by the comparator circuit 13 satisfies a first condition and the result of decision obtained by the first decision circuit 14 satisfies a second condition. Meanwhile, the second decision circuit 15 decides that the correction circuit 12 be operating properly if the result of the comparison obtained by the comparator circuit 13 does not satisfy the first condition and the result of decision obtained by the first decision circuit 14 satisfies the second condition. That is to say, the signal processing device 1 according to this embodiment may determine, based on the result of comparison obtained by the comparator circuit 13 and the result of decision obtained by the first decision circuit 14, whether the correction circuit 12 is operating properly or not.

In addition, the signal processing device 1 according to this embodiment decides that the correction circuit 12 be operating improperly, if the magnitude of inertial force determined based on the first detection signal Sig2 is equal to or greater than the second threshold value and the absolute value of the difference between the respective values of the first detection signal Sig2 and the second detection signal Sig3 is equal to or less than the first threshold value TH1. Therefore, a decision may be made that the correction circuit 12 be operating improperly if the absolute value of the difference between the respective values of the first detection signal Sig2 and the second detection signal Sig3 is equal to or less than the first threshold value TH1.

Furthermore, in the signal processing device 1 according to this embodiment, the storage unit 16 is configured to be able to rewrite the decision threshold value (second threshold value) to be used by the first decision circuit 14 to determine the magnitude of the inertial force based on the first detection signal Sig2. Therefore, even if the magnitude of inertial force at which the sensor output starts to change non-linearly varies, such a situation may be coped with by rewriting the decision threshold value.

(5) Variations

Note that the embodiment described above is only an exemplary one of various embodiments of the present disclosure and should not be construed as limiting. Rather, the embodiment may be readily modified in various manners depending on a design choice or any other factor without departing from the scope of the present disclosure. The functions of the signal processing device 1 according to the embodiment described above may also be implemented as a signal processing method, a computer program, or a non-transitory storage medium on which the computer program is stored, for example.

A signal processing method according to an aspect includes a detection step (a second step S2), a correction step (a fourth step S4), and a comparison step (an eighth step S8). The detection step includes generating a first detection signal Sig2, based on an output signal Sig1 of a capacitive detection element 2, 3, 4 that detects inertial force. The correction step includes correcting non-linearity of the first detection signal Sig2 to output a second detection signal Sig3 thus corrected. The comparison step includes comparing the first detection signal Sig2 and the second detection signal Sig3 with each other to output a comparison signal Sig4 representing a result of comparison.

A program according to another aspect is designed to cause one or more processors to perform the signal processing method described above.

Next, variations of the exemplary embodiment described above will be enumerated one after another. The variations to be described below may be adopted in combination as appropriate.

The signal processing device 1 according to the present disclosure includes a computer system. The computer system includes a processor and a memory as principal hardware components. The functions of the signal processing device 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be implemented as a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a largescale integrated circuit.

Also, in the embodiment described above, a plurality of constituent elements of the signal processing device 1 are integrated together in a single housing. However, this is not an essential configuration for the signal processing device 1. Alternatively, those constituent elements of the signal processing device 1 may be distributed in multiple different housings. Still alternatively, at least some functions of the signal processing device 1 (e.g., the function of the correction circuit 12) may be implemented as a cloud computing system as well.

Optionally, the signal processing device 1 may have a decision mode designed to make the second decision circuit 15 determine, based on artificially generated inertial force (acceleration), whether the correction circuit 12 is operating properly or not. In that case, for example, a fixed electrode is provided on the upper surface of the lower cover 7 described above and a moving electrode is provided on the lower surface of the weight 21 to form at least one capacitor. Then, the fixed and the moving electrodes are energized to generate electrostatic force between the two electrodes. This causes the weight 21 to tilt and thereby generate artificial acceleration. Finally, the signal processing device 1 makes the second decision circuit 15 determine, based on the acceleration artificially generated in this manner, whether the correction circuit 12 is operating properly or not. This allows a determination whether the correction circuit 12 is operating properly or not to be made, not only at the time of pre-shipment inspection of the inertial sensor 10, but also even while the inertial sensor 10 is being used.

In the embodiment described above, the inertial sensor 10 is implemented as a triaxial acceleration sensor. However, the inertial sensor 10 may also be, for example, a biaxial acceleration sensor.

In the embodiment described above, the acceleration in the X-axis direction, the acceleration in the Y-axis direction, and the acceleration in the Z-axis direction are detected separately by three different detection circuits 11, respectively. However, for example, the acceleration in the X-axis direction, the acceleration in the Y-axis direction, and the acceleration in the Z-axis direction may be detected by a single detection circuit. In that case, a multiplexor, for example, may be used to time-sequentially detect the acceleration in the X-axis direction, the acceleration in the Y-axis direction, and the acceleration in the Z-axis direction in this order.

In the embodiment described above, the inertial sensor 10 is a surface-mounted sensor. However, the inertial sensor 10 may also be, for example, a through hole mounted sensor.

In the embodiment described above, the inertial sensor 10 is an acceleration sensor. However, the inertial sensor 10 does not have to be an acceleration sensor, but may be, for example, an angular velocity sensor (gyrosensor).

In the embodiment described above, the signal processing device 1 is an ASIC. However, the signal processing device 1 is not limited to the ASIC but may also be, for example, an FPGA (Field-Programmable Gate Array) or made up of one or more processors and one or more memories.

In the embodiment described above, the acceleration in the X-axis direction, the acceleration in the Y-axis direction, and the acceleration in the Z-axis direction are detected separately by three different detection elements 2, 3, 4 respectively. However, for example, the acceleration in the X-axis direction, the acceleration in the Y-axis direction, and the acceleration in the Z-axis direction may be detected by a single detection element. Specifically, the detection element may also be implemented as a MEMS (microelectromechanical systems) element in which the functions of detecting the acceleration in the X-axis direction, the acceleration in the Y-axis direction, and the acceleration in the Z-axis direction are integrated into a single chip.

In the embodiment described above, the second decision circuit 15 is implemented as an AND circuit. However, the second decision circuit 15 is not limited to the AND circuit but may also be, for example, a NAND circuit. Moreover, the second decision circuit 15 may have any other configuration as long as the second decision circuit 15 is configured to determine, based on the comparison signal Sig4 and the first decision signal Sig5, whether the correction circuit 12 is operating properly or not.

In the embodiment described above, the first threshold value TH1 and the second threshold value (decision threshold value) are fixed values. However, at least one of the first threshold value TH1 or the second threshold value may be adjustable.

(Recapitulation)

As can be seen from the foregoing description, a signal processing device (1) according to a first aspect includes a detection circuit (11), a correction circuit (12), and a comparator circuit (13). The detection circuit (11) generates a first detection signal (Sig2), based on an output signal (Sig1) of a capacitive detection element (2, 3, 4) that detects inertial force. The correction circuit (12) corrects non-linearity of the first detection signal (Sig2) and outputs a second detection signal (Sig3) thus corrected. The comparator circuit (13) compares the first detection signal (Sig2) and the second detection signal (Sig3) with each other and outputs a comparison signal (Sig4) representing a result of comparison.

This aspect allows the operation of the correction circuit (12) to be checked based on a comparison signal (Sig4) representing a result of comparison between the first detection signal (Sig2) supplied from the detection circuit (11) and the second detection signal (Sig3) supplied from the correction circuit (12).

A signal processing device (1) according to a second aspect, which may be implemented in conjunction with the first aspect, further includes a first decision circuit (14) and a second decision circuit (15). The first decision circuit (14) determines, based on the first detection signal (Sig2), magnitude of the inertial force and outputs a first decision signal (Sig5) representing a result of decision. The second decision circuit (15) determines, based on the comparison signal (Sig4) and the first decision signal (Sig5), whether the correction circuit (12) is operating properly or not and outputs a second decision signal (Sig6) representing a result of decision. The second decision circuit (15) decides that the correction circuit (12) be operating improperly, if the result of the comparison obtained by the comparator circuit (13) satisfies the first condition and the result of the decision obtained by the first decision circuit (14) satisfies the second condition.

This aspect allows deciding, based on the result of comparison obtained by the comparator circuit (13) and the result of decision obtained by the first decision circuit (14), that the correction circuit (12) be operating improperly.

A signal processing device (1) according to a third aspect, which may be implemented in conjunction with the first or second aspect, further includes a first decision circuit (14) and a second decision circuit (15). The first decision circuit (14) determines, based on the first detection signal (Sig2), magnitude of the inertial force and outputs a first decision signal (Sig5) representing a result of decision. The second decision circuit (15) determines, based on the comparison signal (Sig4) and the first decision signal (Sig5), whether the correction circuit (12) is operating properly or not and outputs a second decision signal (Sig6) representing a result of decision. The second decision circuit (15) decides that the correction circuit (12) be operating properly, if the result of the comparison obtained by the comparator circuit (13) does not satisfy a first condition and the result of the decision obtained by the first decision circuit (14) satisfies a second condition.

This aspect allows deciding, based on the result of comparison obtained by the comparator circuit (13) and the result of decision obtained by the first decision circuit (14), that the correction circuit (12) be operating properly.

In a signal processing device (1) according to a fourth aspect, which may be implemented in conjunction with the second or third aspect, the first condition is that an absolute value of difference between respective values of the first detection signal (Sig2) and the second detection signal (Sig3) be equal to or less than a first threshold value (TH1). The second condition is that the magnitude of the inertial force determined based on the first detection signal (Sig2) be equal to or greater than a second threshold value.

This aspect allows deciding that the correction circuit (12) be operating improperly, if the magnitude of inertial force determined based on the first detection signal (Sig2) is equal to or greater than the second threshold value and the absolute value of the difference between the respective values of the first detection signal (Sig2) and the second detection signal (Sig3) is equal to or less than the first threshold value (TH1). Therefore, a decision may be made that the correction circuit (12) be operating improperly if the absolute value of the difference between the respective values of the first detection signal (Sig2) and the second detection signal (Sig3) is equal to or less than the first threshold value (TH1).

A signal processing device (1) according to a fifth aspect, which may be implemented in conjunction with any one of the second to fourth aspects, further includes a storage unit (16). The storage unit (16) stores, and may rewrite, a decision threshold value to be used by the first decision circuit (14) to determine, based on the first detection signal (Sig2), the magnitude of the inertial force.

According to this aspect, even if the magnitude of inertial force at which the sensor output starts to change non-linearly varies, such a situation may be coped with by rewriting the decision threshold value.

A signal processing device (1) according to a sixth aspect, which may be implemented in conjunction with any one of the second to fifth aspects, has a decision mode. The decision mode is designed to make the second decision circuit (15) determine, based on artificially generated inertial force, whether the correction circuit (12) is operating properly or not.

This aspect allows the operation of the correction circuit (12) to be checked based on the artificially generated inertial force.

An inertial sensor (10) according to a seventh aspect includes the signal processing device (1) according to any one of the first to sixth aspects and the capacitive detection element (2, 3, 4).

This aspect allows the operation of the correction circuit (12) to be checked based on a comparison signal (Sig4) representing a result of comparison between the first detection signal (Sig2) supplied from the detection circuit (11) and the second detection signal (Sig3) supplied from the correction circuit (12).

A signal processing method according to an eighth aspect includes a detection step (S2), a correction step (S4), and a comparison step (S8). The detection step (S2) includes generating a first detection signal (Sig2), based on an output signal (Sig1) of a capacitive detection element (2, 3, 4) that detects inertial force. The correction step (S4) includes correcting non-linearity of the first detection signal (Sig2) and outputting a second detection signal (Sig3) thus corrected. The comparison step (S8) includes comparing the first detection signal (Sig2) and the second detection signal (Sig3) with each other and outputting a comparison signal (Sig4) representing a result of comparison.

This aspect allows the operation of the correction circuit (12) to be checked based on a comparison signal (Sig4) representing a result of comparison between the first detection signal (Sig2) generated in the detection step (S2) and the second detection signal (Sig3) output in the correction step (S4).

A program according to a ninth aspect is designed to cause one or more processors to perform the signal processing method according to the eighth aspect.

This aspect allows the operation of the correction circuit (12) to be checked based on a comparison signal (Sig4) representing a result of comparison between the first detection signal (Sig2) generated in the detection step (S2) and the second detection signal (Sig3) output in the correction step (S4).

Note that the constituent elements according to the second to sixth aspects are not essential constituent elements for the signal processing device (1) but may be omitted as appropriate.

REFERENCE SIGNS LIST

1 Signal Processing Device
11 Detection Circuit
12 Correction Circuit
13 Comparator Circuit
14 First Decision Circuit
15 Second Decision Circuit
16 Storage Unit
2, 3, 4 Detection Element
10 Inertial Sensor
Sig1 Output Signal
Sig2 First Detection Signal
Sig3 Second Detection Signal
Sig4 Comparison Signal
Sig5 First Decision Signal
Sig6 Second Decision Signal
S2 Second Step (Detection Step)
S4 Fourth Step (Correction Step)
S8 Eighth Step (Comparison Step)
TH1 First Threshold Value

The invention claimed is:

1. A signal processing device comprising:
a detection circuit configured to generate a first detection signal, based on an output signal of a capacitive detection element, the capacitive detection element being configured to detect an inertial force;
a correction circuit configured to correct non-linearity of the first detection signal and output a second detection signal thus corrected;
a comparator circuit configured to compare the first detection signal and the second detection signal with each other and output a comparison signal representing a result of comparison;
a first decision circuit configured to determine, based on the first detection signal, magnitude of the inertial force and output a first decision signal representing a result of decision; and
a second decision circuit configured to determine, based on the comparison signal and the first decision signal, whether the correction circuit is operating properly or not and output a second decision signal representing a result of decision.

2. The signal processing device of claim 1, wherein the second decision circuit is configured to decide that the correction circuit be operating improperly, if the result of the comparison obtained by the comparator circuit satisfies a first condition and the result of the decision obtained by the first decision circuit satisfies a second condition.

3. The signal processing device of claim 1, wherein the second decision circuit is configured to decide that the correction circuit be operating properly, if the result of the comparison obtained by the comparator circuit does not satisfy a first condition and the result of the decision obtained by the first decision circuit satisfies a second condition.

4. The signal processing device of claim 2, wherein
the first condition is that an absolute value of difference between respective values of the first detection signal and the second detection signal be equal to or less than a first threshold value, and
the second condition is that the magnitude of the inertial force determined based on the first detection signal be equal to or greater than a second threshold value.

5. The signal processing device of claim 2, further comprising a storage unit configured to store, and be able to rewrite, a decision threshold value to be used by the first decision circuit to determine, based on the first detection signal, the magnitude of the inertial force.

6. The signal processing device of claim 2 having a decision mode designed to make the second decision circuit determine, based on artificially generated inertial force, whether the correction circuit is operating properly or not.

7. An inertial sensor comprising:
the signal processing device of claim 1; and
the capacitive detection element.

8. A signal processing method comprising:
a detection step including generating a first detection signal, based on an output signal of a capacitive detection element, the capacitive detection element being configured to detect an inertial force;
a correction step performed by a correction circuit that corrects non-linearity of the first detection signal and outputting a second detection signal thus corrected;
a comparison step including comparing the first detection signal and the second detection signal with each other and outputting a comparison signal representing a result of comparison;
a first decision step including determining, based on the first detection signal, magnitude of the inertial force and output a first decision signal representing a result of decision; and
a second decision step including determining, based on the comparison signal and the first decision signal, whether the correction circuit is operating properly or not and output a second decision signal representing a result of decision.

9. A non-transitory computer-readable tangible recording medium storing a program designed to cause one or more processors to perform the signal processing method of claim 8.

10. The signal processing device of claim 2, wherein
the second decision circuit is configured to decide that the correction circuit be operating properly, if the result of the comparison obtained by the comparator circuit does not satisfy a first condition and the result of the decision obtained by the first decision circuit satisfies a second condition.

11. The signal processing device of claim 3, wherein
the first condition is that an absolute value of difference between respective values of the first detection signal and the second detection signal be equal to or less than a first threshold value, and
the second condition is that the magnitude of the inertial force determined based on the first detection signal be equal to or greater than a second threshold value.

12. The signal processing device of claim 10, wherein
the first condition is that an absolute value of difference between respective values of the first detection signal and the second detection signal be equal to or less than a first threshold value, and
the second condition is that the magnitude of the inertial force determined based on the first detection signal be equal to or greater than a second threshold value.

* * * * *